United States Patent
Adamek et al.

(10) Patent No.: US 6,491,145 B2
(45) Date of Patent: Dec. 10, 2002

(54) REGULABLE DASHPOT FOR MOTOR VEHICLES, AND METHOD OF ADJUSTING SUCH A DASHPOT

(75) Inventors: Jürgen Adamek, Ennepetal (DE); Frank von Oppenkowski, Dülmen (DE); Wolfgang Humers, Ennepetal (DE); Dirk Feist, Bergisch-Gladbach (DE); Kais Saaddedin, Bochum (DE)

(73) Assignee: Krupp Bilstein GmbH, Ennepetal (DE)

( * ) Notice: Subject to any disclaimer, the term of this patent is extended or adjusted under 35 U.S.C. 154(b) by 0 days.

(21) Appl. No.: 09/916,085

(22) Filed: Jul. 26, 2001

(65) Prior Publication Data

US 2002/0020595 A1 Feb. 21, 2002

(30) Foreign Application Priority Data

| Aug. 18, 2000 | (DE) | ............................ 100 40 518 |
| Feb. 2, 2001 | (DE) | ............................ 101 04 640 |
| Jul. 6, 2001 | (EP) | ............................ 01113888 |

(51) Int. Cl.$^7$ ................................. F16F 9/34
(52) U.S. Cl. .................. 188/282.2; 188/316; 188/282.8
(58) Field of Search ............................. 188/282.5, 378, 188/282.1, 282.2, 282.6, 282.8, 287, 313, 316, 522.22, 322.15, 280

(56) References Cited

U.S. PATENT DOCUMENTS

| 4,893,699 | A | * | 1/1990 | Engelsdorf et al. ..... 188/322.15 |
| 4,958,704 | A | * | 9/1990 | Leiber et al. ............ 188/282.3 |
| 5,285,878 | A | * | 2/1994 | Scheffel et al. .......... 188/282.2 |
| 6,264,015 | B1 | * | 7/2001 | De Kock .................. 188/282.5 |
| 6,309,033 | B1 | * | 10/2001 | Zaviska ................. 137/630.14 |

* cited by examiner

Primary Examiner—Christopher P. Schwartz
Assistant Examiner—Melanie Torres
(74) Attorney, Agent, or Firm—Max Fogiel

(57) ABSTRACT

A regulable hydraulic dashpot for motor vehicles and including a cylinder (1) filled with hydraulic fluid and a piston (2) that is attached to the end of a piston rod (7), travels back and forth inside the cylinder, and divides it into two chambers (3 & 4) that communicate through at least one bypass. The bypass's cross-section can be varied in size by a component that is, preferably continuously, controlled by a motor or magnet. To facilitate adjusting the dashpot, the cross-section varying component is a plate-shaped slide (23) provided with one or more breaches (25) and traveling from side to side, preferably in a slot (24), with its flat surface (27) subjected to fluid from each cylinder chamber alternately by way of channels (14, 15, & 16).

14 Claims, 8 Drawing Sheets

REGULABLE DASHPOT FOR MOTOR VEHICLES, AND METHOD OF ADJUSTING SUCH A DASHPOT

BACKGROUND OF THE INVENTION

The present invention concerns regulable dashpots for motor vehicles and a method of adjusting such a dashpot.

Dashpots are manufactured regulable to allow adaptation of a motor vehicle's performance to given driving and road conditions. Additional regulable bypass valves are accordingly assigned to the shock-absorbing valves in the dashpot's piston. The regulation is usually carried out by way of electronic programs that control the level of attenuation in accordance with the results of such various measurements as vehicle speed, steering-wheel state, and travel dynamics.

A regulable dashpot is known from German 4 011 358 C1 and GB 2 222 227 A. These dashpots employ a motor to adjust a positioning component. The motor rotates or displaces a bell or rotating component in relation to a main interior bore provided with subsidiary radial bores.

These dashpots have drawbacks. The rotation or displacement requires both powerful adjustment forces and powerful retaining forces in that the rapid flow inside the bypass valve can lead to unintended self-adjustment and especially to total closing. This can have two results. Either the motor or the corresponding magnet is too large to fit inside the dashpot or some or all of the excess heat generated therein is too high to divert. Adjustments accordingly have to be undertaken outside the dashpot itself. This requirement, however, further aggravates the problems encountered in retention and control.

Another regulable dashpot of the genus is known from German 19 850 152 C1. The problems of powerful adjustment and stabilization forces are solved in this dashpot by hydraulically relieving a component of the controls, a stroke piston.

This embodiment, however, has the drawback that the controls component is composed of many parts. It also requires a complicated system of channels and check valves in that the hydraulic relief employs additional channels.

SUMMARY OF THE INVENTION

The object of the present invention is a simpler controls component that will demand less powerful adjustment and retaining forces.

The present invention has several advantages. It exploits simple means to keep the adjustment and retaining forces low-powered. Of particular advantage from this aspect is that the valve will have a very high level of self-retention even when the pressure differences are extensive, counter-acting any powerful induced adjustment forces.

BRIEF DESCRIPTION OF THE DRAWINGS

One embodiment of the present invention will now be specified with reference to the drawing, wherein.

DESCRIPTION OF THE PREFERRED EMBODIMENTS

Figure 1:
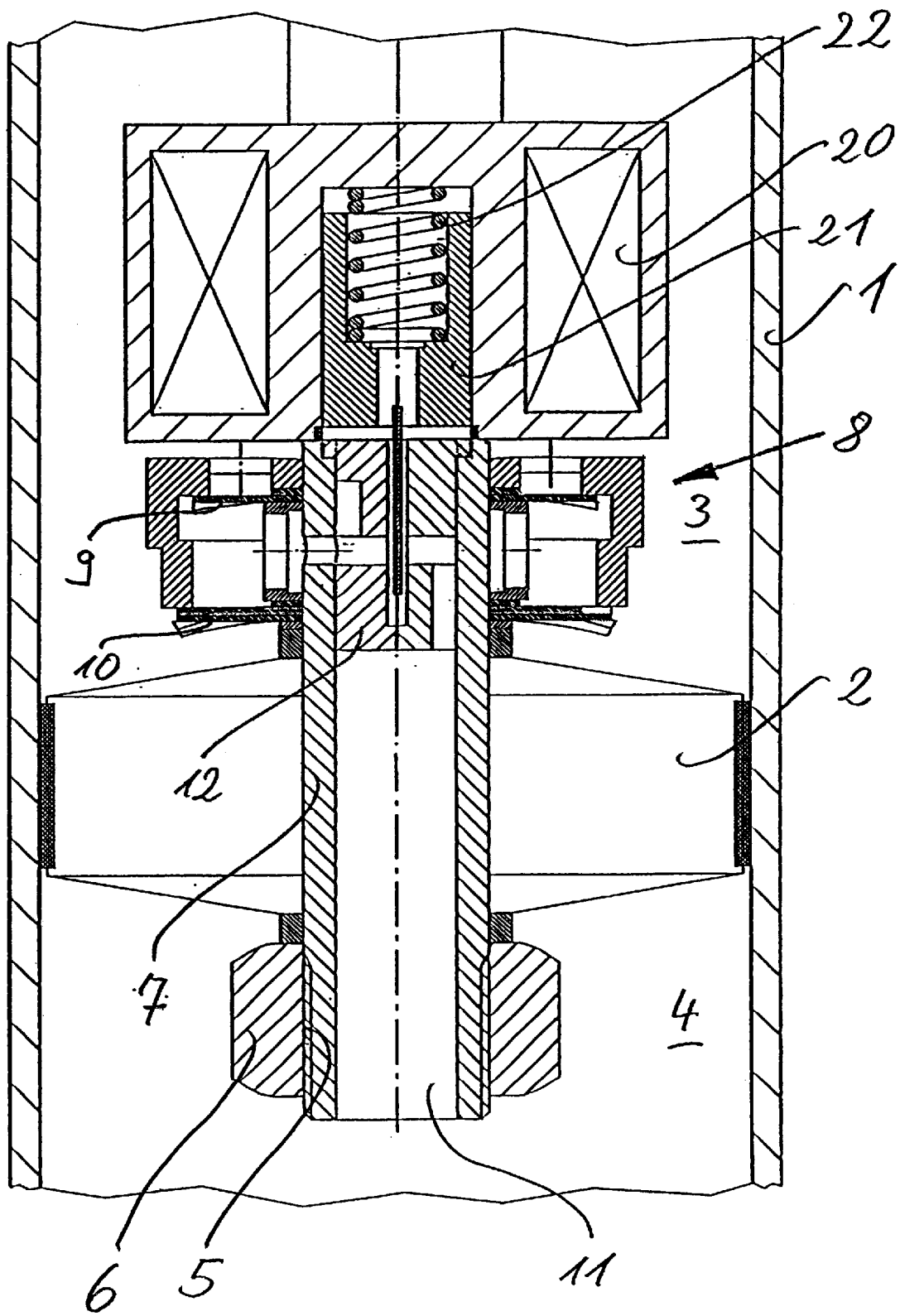
FIG. 1 is a transverse section through a dashpot piston and bypass valve, FIG. 2 a larger-scale detail of the bypass valve.

The dashpot illustrated in FIG. 1 has a cylinder 1 divided into two chambers 3 and 4 by a piston 2. Piston 2 is conventionally provided with unillustrated valves and is mounted by way of a threaded section 5 and nut 6 on the end of a piston rod 7 that travels back and forth inside cylinder 1.

A bypass valve 8 is mounted around piston rod 7 either above piston 2 as illustrated or below it. Both bypass valve 8 and piston 2 are provided with backflow-preventing gaskets 9 and 10 in the form of cup springs. Bypass valve 8 and piston 2 communicate with the cylinder's upper chamber 3 by way of channels that will be specified hereinafter.

Figure 2:
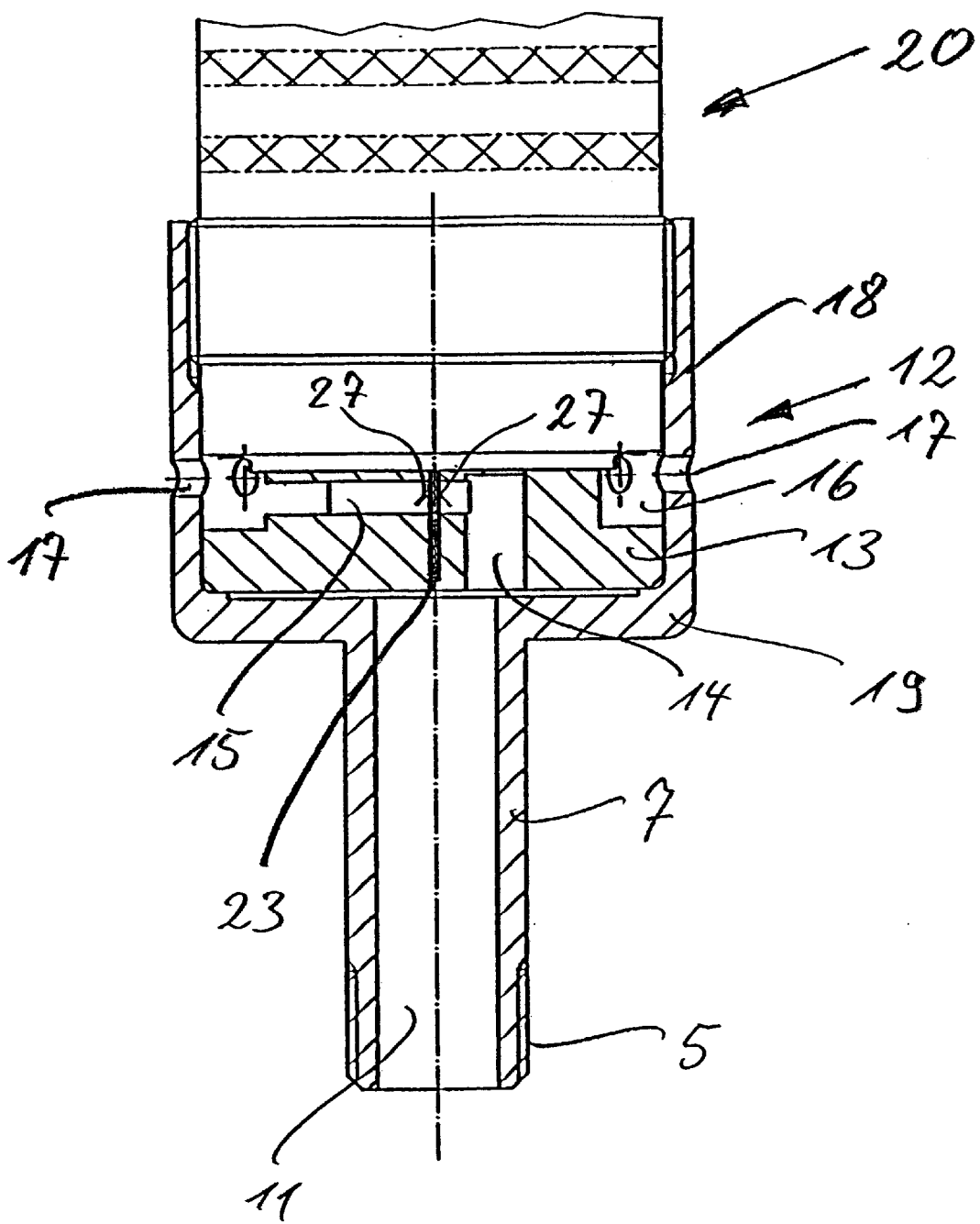
Figure 3:
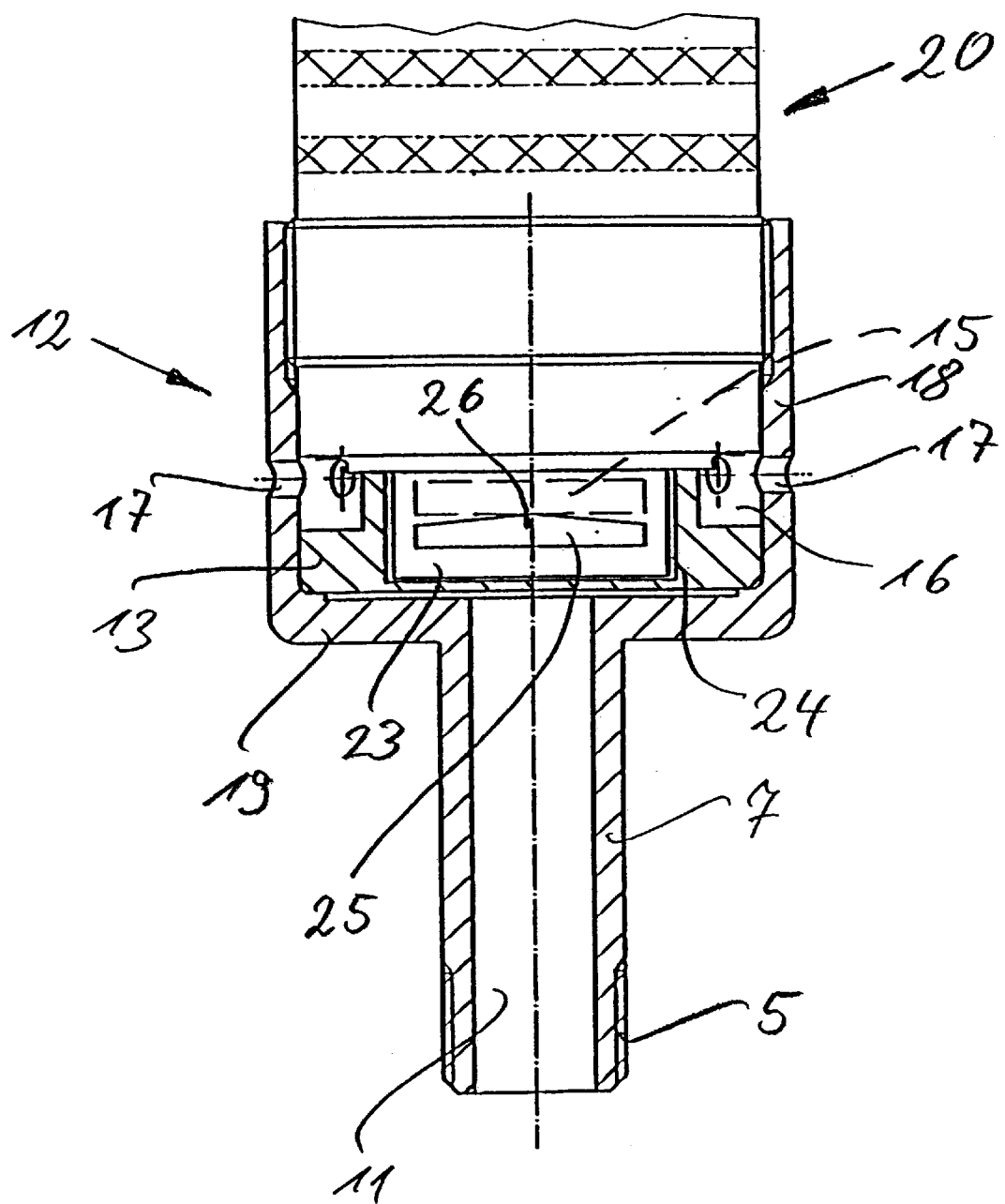
FIG. 3 illustrates the bypass valve illustrated in FIG. 2 rotated 90°.

The lower end of piston rod 7 is provided with a central bore 11. The upper end of bore 11 is occupied by a continuously variable bypass valve 12, illustrated in detail in FIGS. 2 and 3. The body 13 of bypass valve 12 is penetrated by channels and by an annular compartment that allow communication between cylinder chambers 3 and 4. In contrast to the one illustrated in FIG. 1, the bypass valve 12 in FIGS. 2 and 3 is accommodated in a cup 19 at the top of the central bore 11 in piston rod 7 rather then inside it. The aforesaid channels and compartment consist of an intake channel 14, a controls channel 15, and an annular compartment 16. Intake channel 14 communicates hydraulically with central bore 11, controls channel 15 opens into it at a right angle, and annular compartment 16 communicates hydraulically with upper cylinder chamber 3 by way of subsidiary bores 17 through the wall 18 of cup 19.

Accommodated above bypass valve 12 is an electromagnet 20. Its core 21 travels up and down continuously against the force exerted by a helical spring 22. Core 21 is a component of the overall controls and is provided with a slide 23 in the form of a plate. Slide 23 extends at a right angle to controls channel 15 and is accommodated on all sides in a slot 24. The slide 23 in the illustrated embodiment is a resilient tongue with a gable-shaped breach 25. As long as bypass valve 12 is closed, breach 25 will rest below controls channel 15 and prevent fluid from flowing through it. The gabled shape of breach 25 allows bypass valve 12 to be opened a little at a time in that controls channel 15 can be initially actuated only by the breach's peak 26. Controls channels and breaches of different shapes will occur to one of skill in the art as the occasion arises. Bypass valve 12 will be completely open once the cross-section of breach 25 is totally aligned with the cross-section of controls channel 15.

As will be immediately evident from FIGS. 1 and 2, any considerable difference between the pressure of the fluid in upper cylinder chamber 3 and that in lower cylinder chamber 4 will force the flat surfaces 27 of slide 23 against the opposing surfaces of slot 24, automatically closing off the slide's accommodation. Hence, electromagnet 20 will need to exert almost no retaining force.

Once the level of pressure in upper cylinder chamber 3 equals that of the pressure in lower cylinder chamber 4, primarily once piston rod 7 has arrived at its point of return, that is, the self-inhibition will be canceled. Slide 23 will be easily accessible inside slot 24 and can be adjusted without exerting a great deal of force. Since the piston rod in a dashpot arrives very frequently at its upper and lower points of return, finely tuned regulation will be possible even when adjustment is carried out only at those times. The controls slide can accordingly be regulated in various ways. Electromagnet 20 can for example be turned on at low current. When the difference in cylinder-chamber pressures is high in this event, the closing forces exerted on the slide 23 will be so powerful that the magnet will be unable to handle them, and adjustment will occur only as piston rod 7 travels through its point of return. Alternatively, the controls can intentionally be set to ensure that adjustment occurs only at that point.

Figure 4:
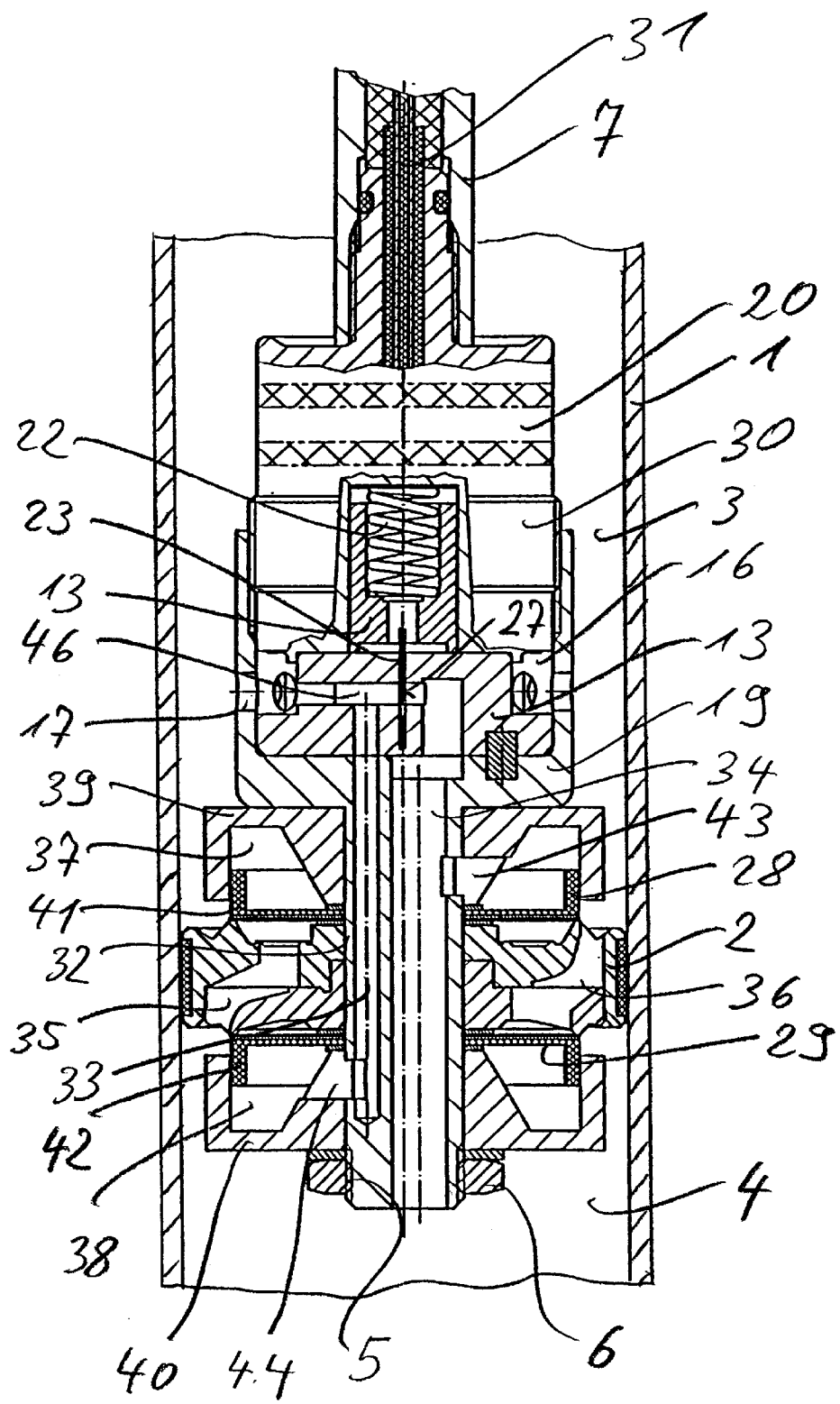
FIG. 4 is a transverse section similar to FIG. 1 but with the piston valves subjected to pressure.

The dashpot illustrated in FIG. 4 also has a cylinder 1 divided into two chambers 3 and 4 by a piston 2. Piston 2 is conventionally provided with attenuating valves 28 and 29 and fastened by a threaded section 5 and a nut 6 and by way of a controls housing 30 and a cup 19 to a piston rod 7 that travels back and forth inside cylinder 1. Controls housing 30 essentially accommodates an electromagnet 20 with a core 21 that travels continuously or incrementally back and forth against the force exerted by a helical spring 22. Electromagnet 20 is screwed onto piston rod 7. Piston rod 7 is hollow and accommodates electrical connections 31. Electromagnet 20 and controls housing 30 can, as in the illustrated embodiment, comprise a single component.

Cup 19 is screwed onto a threaded section at the lower end of controls housing 30. The lower end of cup 19 is provided with a pin 32 that accommodates piston 2 and with further components that will be specified hereinafter. At least two subsidiary bores 33 and 34, components of a system of channels, extend axially parallel through pin 32.

Exterior compression compartments 37 and 38 border on channels 35 and 36 that penetrate piston rod 7 and are closed off by attenuating valves 28 and 29. Compression compartments 37 and 38 comprise housings 39 and 40 anneals 41 and 42 that move relative to them and rest on attenuating valves 28 and 29. Housings 39 and 40, seals 41 and 42, attenuating valves 28 and 29, and piston 2 rest against and enclose piston-accommodating pin 32 and are secured to it by nut 6. Compression compartments 37 and 38 communicate with subsidiary bores 33 and 34 through radial accesses 43 and 44 that extend through compression-compartment housings 39 and 40 and the wall of piston-accommodating pin 32.

The top of cup 19 accommodates a controls valve with a body 13. Subsidiary bores 33 and 34 continue on into valve body 13 and communicate with each other and with an annular compartment 16 through a transverse channel 46. Annular compartment 16 communicates hydraulically with upper cylinder chamber 3 by way of subsidiary bores 17.

Mounted on the core 21 of electromagnet 20 is a slide 23 in the form of a flat plate, also evident in FIG. 2. Slide 23 extends at a right angle to transverse channel 46 between the outlets of subsidiary bores 33 and 34 and is accommodated on all sides in a slot 24.

As long as the controls valve is closed, in the state represented in FIGS. 1 and 2, compression compartments 37 and 38 will communicate hydraulically with their associated chambers 4 and 3. Compression compartment 38 will communicate with upper cylinder chamber 3 by way of radial access 44, subsidiary bore 33, transverse channel 46, annular compartment 16, and subsidiary bores 17, and compression compartment 37 with lower cylinder chamber 4 by way of radial access 43, and subsidiary bore 34, supporting the level of pressure against attenuating valves 28 and 29 by way of compression compartments 37 and 38. Partial or total opening of the controls valve will now both create a bypass between upper cylinder chambers 3 and 4 by way of subsidiary bore 34, transverse channel 46, and subsidiary bores 17 and reduce the pressure in compression compartments 37 and 38.

The slide 23 in the illustrated example is a resilient tongue provided with a gable-shaped breach 25. As long as the controls valve is closed, breach 25 will rest below transverse channel 46 and prevent fluid from flowing through it. The gabled shape of breach 25 allows the controls valve to be opened a little at a time in that the valve can be initially actuated only by the breach's peak 26. Transverse channels and breaches of different shapes will occur to one of skill in the art as the occasion arises. The controls valve will be completely open once thecross-section of breach 25 is totally aligned with the cross-section of transversechannel 46.

Figure 5:
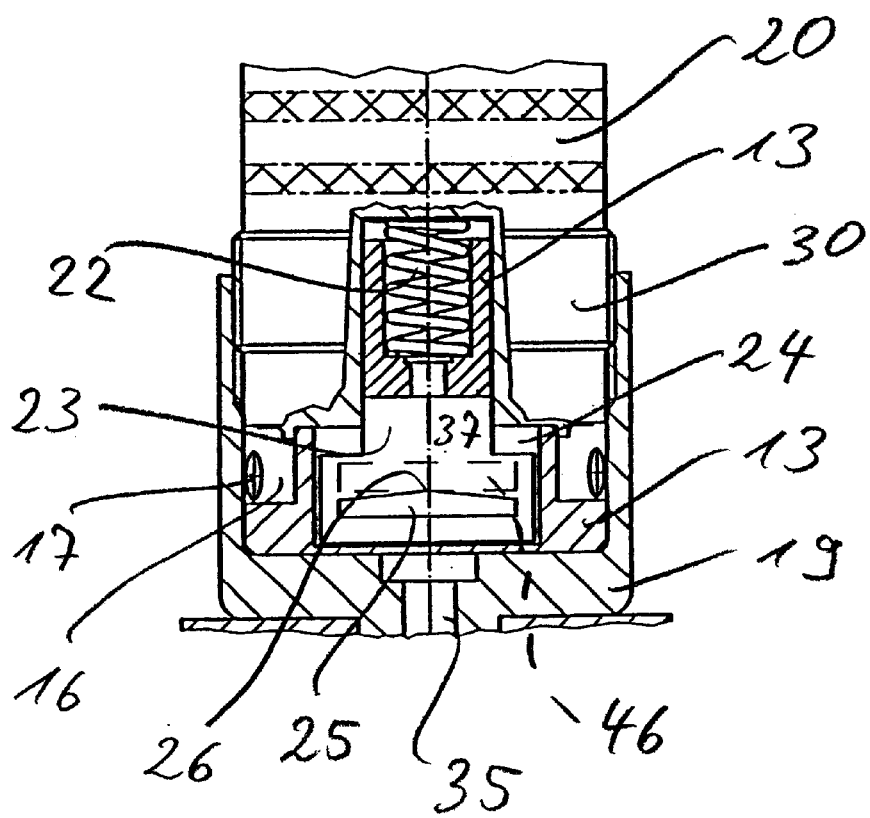
FIG. 5 illustrates the bypass valve illustrated in FIG. 4 rotated 90° as in FIG. 3.

What has been specified hereintofore with respect to self-inhibition and adjustment on the part of the slide 23 depicted in FIGS. 2 and 3 also applies to the embodiment illustrated in FIGS. 4 and 5.

Figure 6:
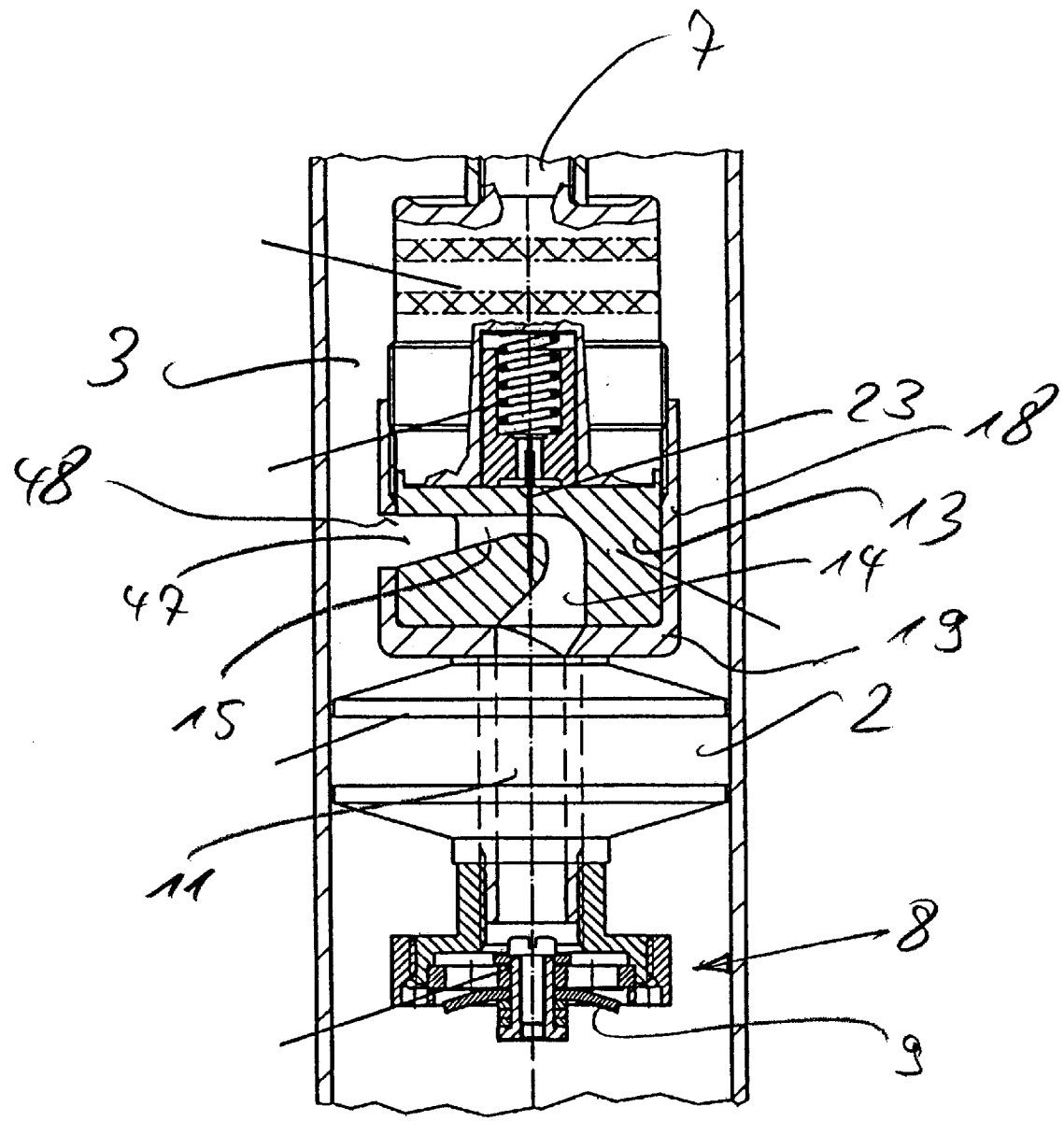
FIG. 6 is a section through the housing of a bypass valve with an optimized flow cross-section.

FIG. 6 shows a piston system like the one illustrated in FIG. 1 with piston 2 screwed onto a bypass valve 8 located below it.

Bypass valve 8 is a "for-convenience" valve, active only in the suction direction. It is accordingly provided only with a single backflow-preventing gasket 9. The same valve, however, could just as well act in both the suction and the compression directions. A double degressive valve could also be employed.

The channel through valve body 13 has been optimized for flow. The section of controls channel 15 toward upper cylinder chamber 3 extends in a plane more or less perpendicular to the axis of the piston rod. It expands in both height and width, starting at slide 23. This section of controls channel 15 terminates in a circumferentialsection 47. The wall 18 of cup 19 is provided with a matching cutout 48.

The section of controls channel 15 that opens into central bore 11 extends smoothly into intake channel 14 and also expands starting at slide 23 and curves, terminating more or less at the center of the lower surface of valve body 13, where it merges into central bore 11.

Figure 7:
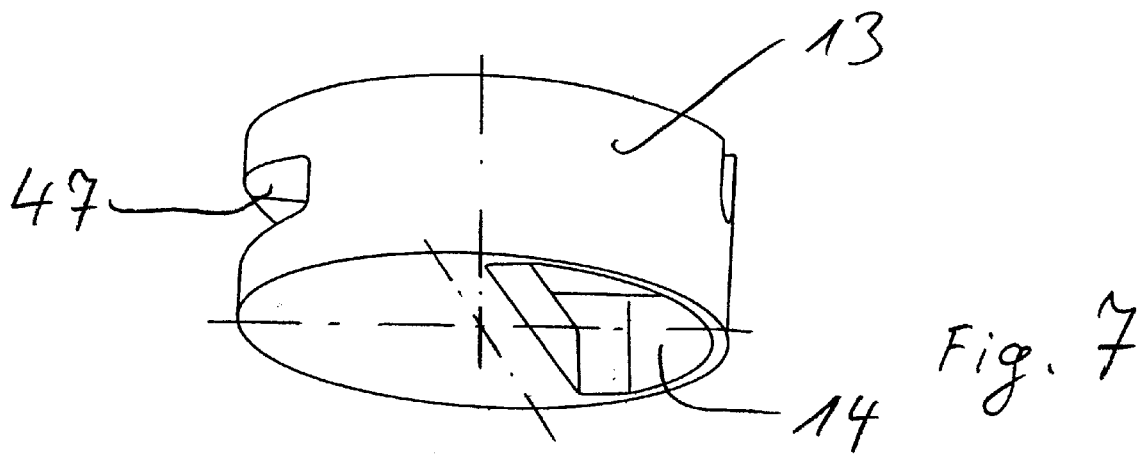
FIG. 7 is a spatial representation of the housing in FIG. 6.

FIG. 7 is a spatial representation of the valve body 13 depicted in FIG. 6.

Figure 8:
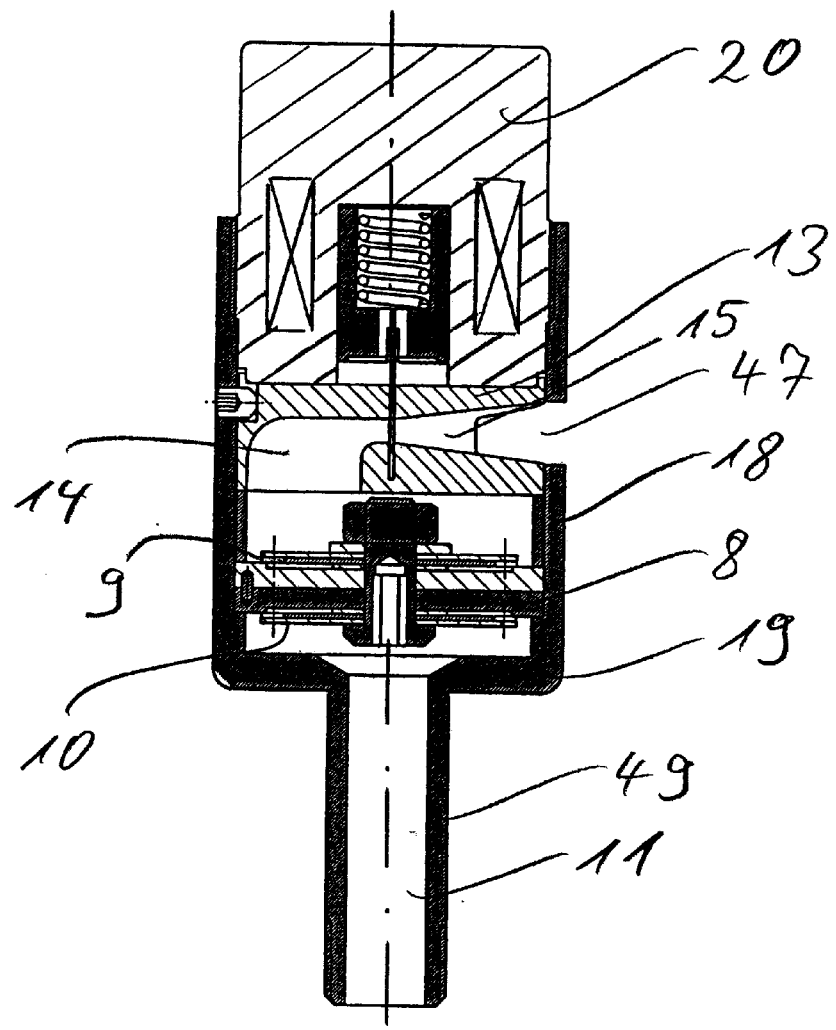
FIG. 8 is a transverse section through another embodiment of the valve illustrated in FIG. 1.

FIG. 8 illustrates another embodiment of the valve system illustrated in FIG. 1 but represents only the structure of the controls valve in conjunction with the bypass piston and the cup.

The cup 19 in the embodiment illustrated in FIG. 8 accommodates and secures a bypass valve 8 along with its body 13. Both components are mounted against and fastened to the cup's wall 18. Wall 18 is provided with an inside thread, by way of which it is screwed onto electromagnet 20. The controls channel 15 and intake channel 14 are similar to the ones illustrated in FIGS. 6 and 7 except that the intake channel need not terminate more or less atthe center of the lower surface of valve body 13. As in the embodiment illustrated in FIG. 1, bypass valve 8 is provided with two backflow-preventing gaskets 9 and 10, which have a corresponding attenuation function. The central bore 11 extends through a pin-like cup-supporting bolt 49. An unillustrated piston is secured to bolt 49 by a nut 6.

Figure 9:
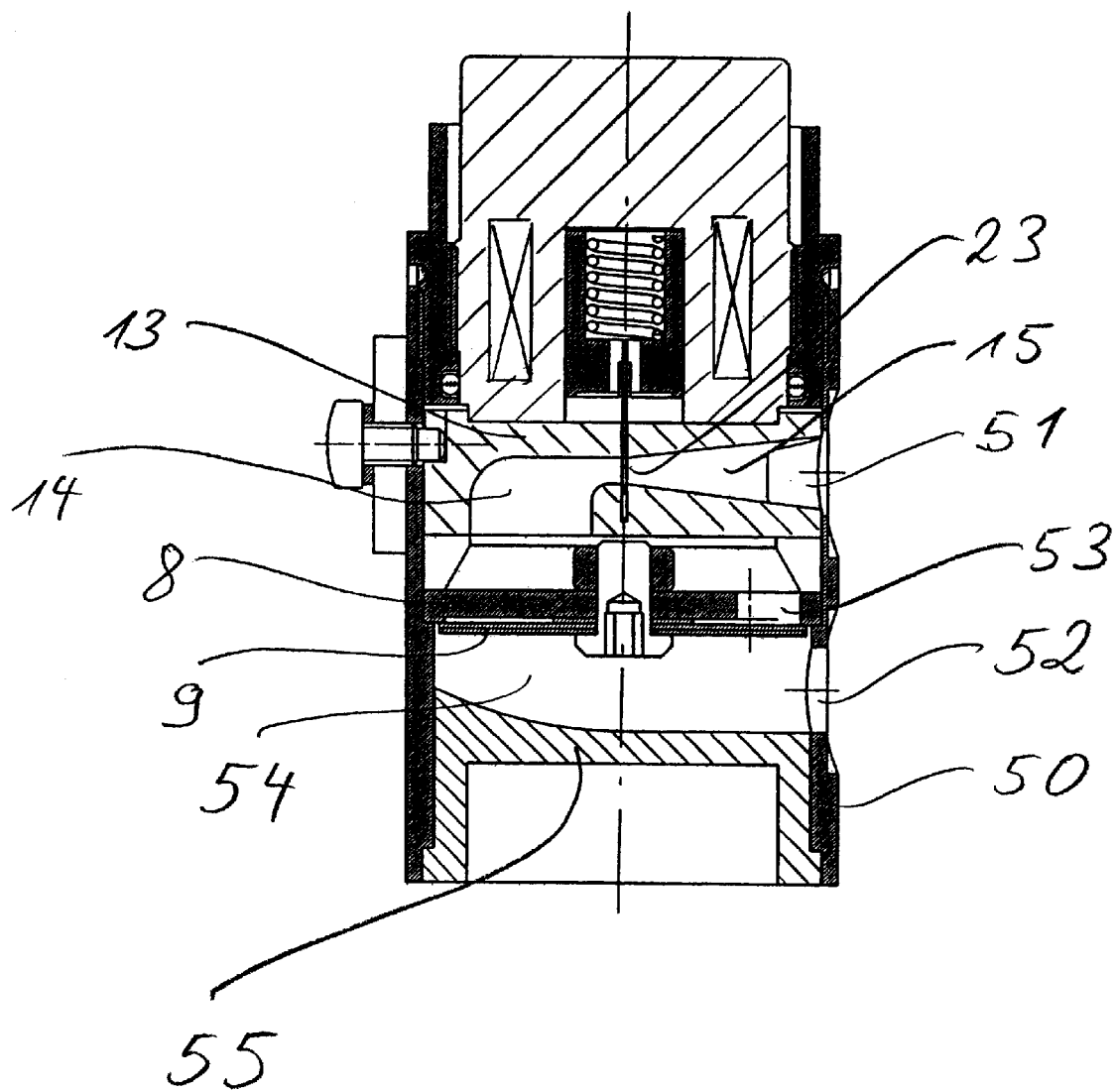
FIG. 9 depicts a single regulation-and-check valve located outside the dashpot cylinder.

The embodiment illustrated in FIG. 9 has a single regulation-and-check valve accommodated in a separate cup-shaped housing 50. Regulation-and-check valves of this species are employed to control bypasses in regulable dashpots when there is not enough height or space to accommodate them. Such valves are mounted on the outside of the dashpot's cylinder. The cylinder 1 in the present embodiment is penetrated by controls channels that communicate with intakes 51 and 52 into the, separate, valve. Although the regulation-and-check valve illustrated in FIG. 9 is generally similar to the valve illustrated in FIG. 8, it is, like the one illustrated in FIG. 6, provided with only one backflow-preventing gasket 9 for bypass valve 8. Controls channel 15 communicate directly with controls intake 51. The intake channel 14 terminates, eccentric in the present example, above bypass valve 8 at the lower surface of valve body 13. Bypass valve 8 communicates hydraulically with intake channel 14. As long as there is pressure in controls intake 51 and as long as slide 23 is more or less open, backflow-preventing gasket 9 will remain elevated above the bore 53 through bypass valve 8, keeping the hydraulic communication with a hydraulics compartment 54 open. The regulation-and-check valve will now communicate again by way of controls intake 52 with the hydraulic region of the regulable dashpot that is to be supplied with pressure. The structure of the base 55 has been optimized to further reduce impedance.

Two or more regulation-and-check valves like those illustrated in FIG. 9 can be mounted on the cylinder of a single regulable dashpot. These components could also be accommodated in a housing 50 associated with several regulation-and-check valves, communicating hydraulically with one another in accordance with the specific purpose.

List of Parts 1. hydraulic cylinder
2. piston
3. upper cylinder chamber
4. lower cylinder chamber
5. threaded section
6. nut
7. piston rod
8. bypass
9. backflow-preventing gasket
10. backflow-preventing gasket
11. central bore
12. bypass valve
13. valve body
14. intake channel
15. controls channel
16. annular compartment
17. subsidiary bore
18. wall
19. cup
20. electromagnet
21. core
22. spring
23. slide
24. slot
25. breach
26. peak
27. surface of slide 23
28. shock-absorbing valve
29. shock-absorbing valve
30. controls housing
31. electrical connections
32. piston-accommodating pin
33. subsidiary bore
34. subsidiary bore
35. piston-penetrating channel
36. piston-penetrating channel
37. compression compartment
38. compression compartment
39. compression-compartment housing
40. compression-compartment housing
41. compression-compartment seal
42. compression-compartment seal
43. radial access
44. radial access
45. controls valve
46. transverse channel
47. circumferential section
48. cutout
49. cup-supporting bolt
50. housing
51. controls intake
52. controls intake
53. bore
54. hydraulics compartment
55. base

What is claimed is:

1. Regulable hydraulic dashpot for motor vehicles and including a cylinder (1) filled with hydraulic fluid and a piston (2) that is attached to the end of a piston rod (7), travels back and forth inside the cylinder, and divides it into two chambers (3 & 4) that communicate through at least one bypass, whereby the bypass's cross-section can be varied in size by a component that is, preferably continuously, controlled by a motor or magnet, characterized in that the cross-section varying component is a plate-shaped slide (23) provided with one or more breaches (25) and traveling from side to side, preferably in a slot (24), with its flat surface (27) subjected to fluid from each cylinder chamber alternately by way of channels (14, 15, & 16).

2. Dashpot as in claim 1, characterized in that the slide (23) is resiliently attached to the magnet's or to the motor's drive component.

3. Dashpot as in claim 1, characterized in that the slide (23) is a resilient tongue.

4. Dashpot as in claim 1, characterized in that the breach (25) expands continuously or incrementally through the slide (23) in direction of action.

5. Dashpot as in claim 1, characterized in that the bypass in the channel-constricting component accommodates one or more upstream, downstream, or parallel spring-loaded valves.

6. Dashpot as in claim 1, characterized in that the channels (14, 15, and/or 46) throught the value body (13) are structured to promote the flow of the fluid.

7. Dashpot as in claim 6, characterized in that the channels (14, 15, and/or 46) expand continuously from each side of the slide (23).

8. Dashpot as in claim 6, characterized in that one of the channels (15 or 46) extends essentially along a plane perpendicular to the piston rod's axis.

9. Dashpot as in claim 1,
characterized by two bypasses, each opposed by a check valve and provided with a channel-constricting component between the cylinder chambers (3 & 4).

10. Dashpot as in claim 9, characterized in that bypasses are outside the cylinder (1).

11. Dashpot as in claim 9, characterized in that one or both check valves and channel-constricting components are accommodated in a separate housing (50).

12. Method of adjusting a dashpot as recited in claim 1, characterized in that the slide (23) operates at or near where the piston (2) reverses motion.

13. Regulable hydraulic dashpot with a piston (2) that is attached to the end of a piston rod (7) and travels back and forth inside a cylinder (1), whereby the piston divides the cylinder into two chambers (3 & 4), is provided with pressure-dependent attenuating valves (28 & 29) that allow exchange of hydraulic fluid in the suction and compression phases, and is penetrated by channels (35 and 36) that the fluid flows through on its way to the attenuating valves, whereby a compression compartment (37 & 38) on the side of each attenuating valve face away from the piston-penetrating channels communicates with one or the other of the chambers by way of a system of channels and exerts a controlling pressure on its associated attenuating valve, and whereby the channels can be constricted by an electromagnetically actuated component that travels back and forth, characterized in that the channel-constricting component is a plate-shaped slide (23) provided with one or more breaches (25), laterally secured preferably in a slot (24), and, at its surfaces (27) and at each end, subjected to fluid from one or the other of the cylinder's compartments and communicating with one or the other of the compression compartments by way of channels (33, 34, 43, 44, 16, 17, & 48).

14. Dashpot as in claim 13, characterized in that the piston (2) is mounted on a cup (19) that is provided with the channels and/or the channel-constricting component, fastened to the piston rod (7), and provided with a pin (32).

* * * * *